United States Patent [19]

Nagai et al.

[11] Patent Number: 4,701,100
[45] Date of Patent: Oct. 20, 1987

[54] INDUSTRIAL ROBOT

[75] Inventors: Masahide Nagai; Minoru Noda; Hitoshi Suzuki, all of Tokyo, Japan

[73] Assignee: Seiko Instruments & Electronics Ltd., Tokyo, Japan

[21] Appl. No.: 764,676

[22] Filed: Aug. 9, 1985

[30] Foreign Application Priority Data

Aug. 15, 1984 [JP] Japan .......................... 59-124454[U]
Aug. 21, 1984 [JP] Japan .......................... 59-126560[U]

[51] Int. Cl.⁴ .............................................. B25J 9/02
[52] U.S. Cl. ................................... 414/751; 104/134; 384/912; 901/16
[58] Field of Search .......................... 414/751; 901/16; 104/134; 308/3 A, 3 R, DIG. 8; 384/912; 123/196 R; 184/5

[56] References Cited

U.S. PATENT DOCUMENTS 3,884,363  5/1975  Ajlouny ............................ 901/16 X
4,123,122 10/1978  Gabrielson et al. ...... 308/DIG. 8 X
4,242,025 12/1980  Thibault ................................ 901/16
4,534,006  8/1985  Minucciani ........................... 901/16
4,583,909  4/1986  Yamashita ............................. 901/16

FOREIGN PATENT DOCUMENTS 65616  4/1984  Japan .................................. 384/912

Primary Examiner—Robert J. Spar
Assistant Examiner—Donald W. Underwood
Attorney, Agent, or Firm—Bruce L. Adams; Van C. Wilks

[57] ABSTRACT

An industrial robot has a head movable in first and second orthogonal directions within a working area to manipulate a workpiece. The industrial robot comprises a stationary base extending along the first direction, an intermediary base slidably disposed on the stationary base to move along the first direction, and a slider slidably disposed on the intermediary base and to move along the second direction. The slider has a supporting portion which extends towards the working area and which supports the head thereon so that the supporting portion positions the head within the working area remotely from the stationary base and the intermediary base.

9 Claims, 3 Drawing Figures

INDUSTRIAL ROBOT

BACKGROUND OF THE INVENTION

This invention relates to a constitution of an industrial robot of the cartesian coordinate type.

Conventionally, in an industrial robot of this type, on a first base which is transferable along a first transfer movement direction, a second base is mounted thereon so as to move along a second transfer movement direction orthogonal to the first transfer movement direction. On a head which is mounted on the second base so as to undergo a transfer movement along the whole length of the second base, a gripping member is attached so as to be able to grasp a workpiece.

However, in conventional constructions, a base is always present on the upper portion of the working range plane or the working area on which the gripper portion member operates so that it is difficult to watch the operation of the gripping member within the working range plane and thus, the operability and useability are impaired.

Moreover, in a conventional popular mounting construction, the mounting construction becomes extremely incurvated due to temperature changes and the difference of the heat expansion rate between a slider and a rail and thus, the precision of the robot operation is deteriorated.

SUMMARY OF THE INVENTION

This invention is intended to solve these problems by providing an intermediary base slideable on a base in a first transfer movement direction, a slider slideable on the intermediary base in a second direction orthogonal to the first transfer movement direction, and a head mounted on the slider and carrying a gripping member.

In addition, the slider is attached with an auxiliary plate the material and the shape of which are selected in order to prevent its incurvature according to temperature change under the consideration of the heat expansion rates of the slider and a rail secured thereon.

BRIEF DESCRIPTION OF THE DRAWINGS

Drawings illustrate embodiments of this invention, wherein.

DETAILED DESCRIPTION OF PREFERRED EMBODIMENTS

Hereinafter, embodiments of this invention are described in detail in conjunction with the drawings.

Figure 1:
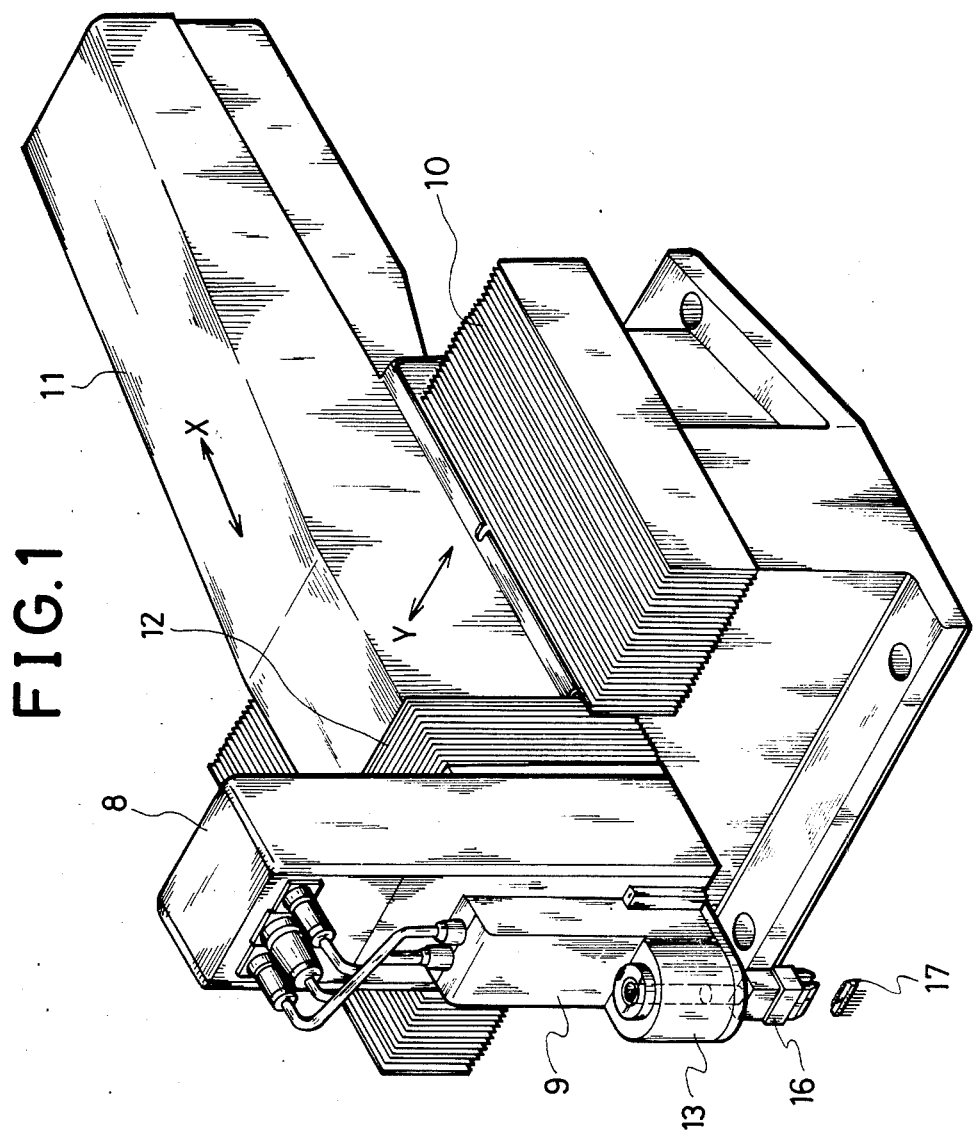
FIG. 1 shows a perspective view of an industrial robot according to the invention.
Figure 2:
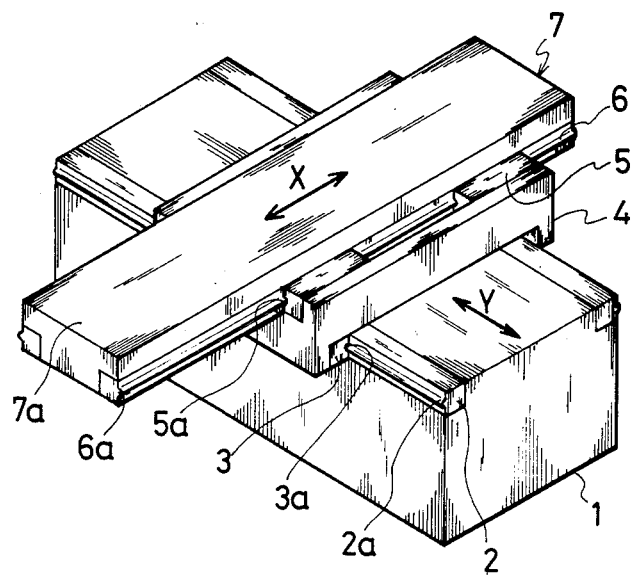
FIG. 2 shows a perspective view of the internal driving system.

FIG. 1 illustrates a perspective view of a whole robot structure of this invention and an internal construction thereof is described in accordance with FIG. 2.

In FIG. 2, reference numeral 1 is a stationary base which is provided along a first transfer movement direction, numeral 2 is one of a pair of first rails or first guide means which is provided on the upper portions of opposite sides of the base 1, numeral 3 is a first bearing having a slot 3a which is engageable with a protruded portion 2a of the first rails 2, numeral 4 is an intermediary base which is provided with the first bearing 3 so as to slideably engage with the first rails, and the intermediary base 4 is able to freely move along a first linear axis or direction. Numeral 5 is a second bearing or second guide means which is provided on an upper side of the intermediary base, numeral 6 is one of a pair of second or slider rails provided with a protruded portion 6a which is engageable with a slot 5a of the second bearing 5, numeral 7 is a slider which is slideably mounted on the intermediary base 4 and is provided with the second rails thereon, and the slider 7 is freely movable along the second linear axis or direction on the intermediary base 4. At the front end or supporting portion 7a of the slider 7, a head 8 is secured as shown in FIG. 1. A support member 9 is attached to the head 8, and a protruding portion 14 is formed at the lower portion of the support member 9 and supports a gripping member 16 which is operable to releasably grasp a workpiece 17. Numeral 10 is a bellows which covers the first rails 12. Numerals 11 and 12 are a frame and a bellows which cover the slider 7 in the manner as shown in FIG. 1.

According to the above mentioned constructions, there is no guide axis in front of the movable region or working area of the gripping member 16, hence it is possible to grasp the workpiece without constraints which would affect the driving time.

Figure 3:
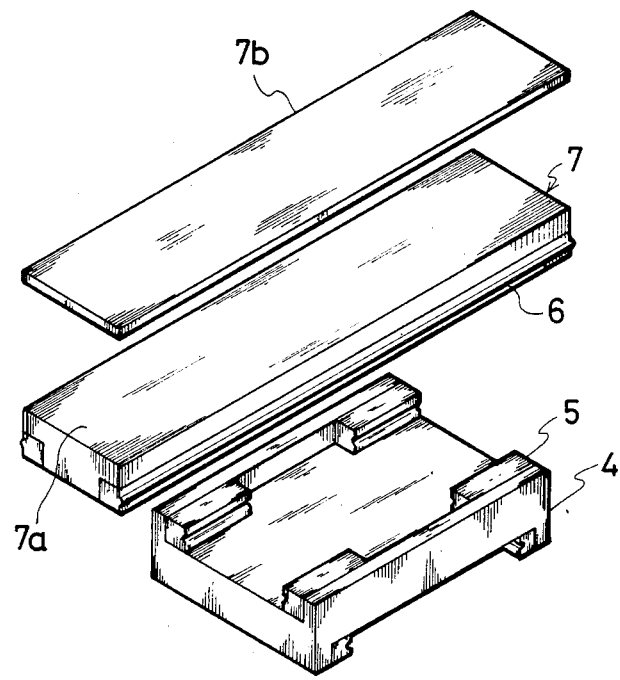
FIG. 3 shows a perspective view of the parts in a disassembled state.

FIG. 3 illustrates a perspective view of the parts in a disassembled state of an embodiment of the invention, wherein numeral 4 is an intermediary base, numeral 5 is a bearing which is secured on the intermediary base 4, numeral 7 is a slider in the form of a plate member and, numeral 6 is a slider rail which is provided on the slider 7. By such a construction, the slider 7 is capable of undergoing a transfer movement relative to the intermediary base 4 by virtue of a sliding contact between the bearing 5 and the rail 6 and/or a rolling contact through a ball, a roller and the like. In this embodiment, an auxiliary plate 7b is secured to the top side of the slider 7. In a case where the rail 6 is composed of iron material and the slider 7 of aluminum and/or copper material (including alloys of these materials) in order to lighten the weight thereof, if the auxiliary plate 7b is not provided thereon, the slider 7 would be extremely incurvated downward in accordance with a rise in the temperature because the heat expansion rate of the slider 7 is larger than that of the rail 6. Accordingly, to prevent such incurvature, the auxiliary plate 7b is formed of a material which has a smaller heat expansion rate than that of the slider 7.

As set forth above, this invention makes it possible to easily watch or view over the entire movable region or working area of the gripping portion, hence the operability is extremely improved, constraints in setting time are reduced, the position teaching operation is simplified, and in addition, the present invention enables the efficient removal of a defective workpiece produced in the assembling operation and for monitoring the assembly state.

Moreover, this invention offers an extremely simplified translation movement guide device which is accurate in its precision positioning despite changes in temperature and is operable with a rapid movement by employing the more lightened small motor and/or cylinder.

What we calim is:

1. An industrial robot of the cartesian coordinate type comprising: a base having a first pair of rails provided on opposite sides of the base and extending along a first transfer movement direction; an intermediary base slidably mounted on said base and having first bearing means slidably engaging with said first rails; second bearing means provided on said intermediary base along a second transfer movement direction orthogonal to said first transfer movement direction; a slider slidably mounted on said intermediary base and having a pair of second rails slidably engaged with said second bearing means, the slider having an extremity portion remote from the intermediary base and extending along the second transfer movement direction, said slider being composed of a smaller specific weight material than that of said second rails and having stepped portions provided on the lower side thereof in which are mounted the second rails, and an auxiliary plate composed of a material with about the same heat expansion rate as that of said second rails and provided on the upper side of said slider opposite to the lower side of the slider; a support member mounted on the extremity portion of the slider; and a gripping member attached to the support member for releasably gripping a workpiece.

2. An industrial robot for moving a head in first and second orthogonal directions within a working area, comprising:

a stationary base located out of the working area and having first guide means thereon extending along a first linear axis;

an intermediary base movably mounted on the stationary base and slidably engaged with the first guide means to undergo linear sliding movement along the first guide means without entering the working area, the intermediary base having second guide means thereon extending along a second linear axis orthogonal to the first linear axis; and a slider slidably mounted on the intermediary base and slidably engaged with the second guide means to undergo linear sliding movement along the second guide means, the slider having an engaging portion slidably engageable with the second guide means, and a supporting portion extending along the second direction toward the working area for supporting a head thereon and for positioning the head remotely from the stationary base and the intermediary base, the slider comprising a plate member having a top side and a bottom side and being composed of relatively light-weight material, a pair of slider rails disposed on the bottom side and slidably engageable with the second guide means, the pair of slider rails being composed of relatively heavy-weight material, and an auxiliary plate secured to the top side and being composed of material having substantially the same heat expansion rate as that of the rail material.

3. An industrial robot according to claim 2; including a support member attached to the head, and a gripping member supported by the support member for releasably gripping a workpiece located within the working area.

4. An industrial robot according to claim 2; wherein the first guide means comprises a pair of guide rails disposed on opposite sides of the stationary base.

5. An industrial robot according to claim 4; wherein the intermediary base includes a pair of first bearings disposed on opposite lower sides thereof and slidably engaged with the pair of guide rails.

6. An industrial robot according to claim 2; wherein the intermediary base has an upper surface, and a pair of opposite side walls extending upwardly from the upper surface and extending parallel to the second linear axis.

7. An industrial robot according to claim 6; wherein the second guide means comprises a second pair of bearings disposed on the upper surface on opposite inside portions of the side walls and slidably engaged with the pair of slider rails.

8. An industrial robot according to claim 2; wherein the slider plate member is composed of aluminum, copper or alloys thereof.

9. An industrial robot according to claim 2; wherein the slider rails are composed of iron.

* * * * *